United States Patent
Daniel et al.

(10) Patent No.: US 7,055,647 B2
(45) Date of Patent: Jun. 6, 2006

(54) ELECTRICALLY-ASSISTED STEERING MECHANISM FOR VEHICLES

(75) Inventors: Philippe Daniel, Villiers sur Loir (FR); Guillaume Briere, Vendome (FR)

(73) Assignee: Nacam France SA, Vendome (FR)

( * ) Notice: Subject to any disclaimer, the term of this patent is extended or adjusted under 35 U.S.C. 154(b) by 207 days.

(21) Appl. No.: 10/882,430

(22) Filed: Jul. 2, 2004

(65) Prior Publication Data

US 2006/0000661 A1    Jan. 5, 2006

(51) Int. Cl.
*B62D 1/00*    (2006.01)
(52) U.S. Cl. .................. 180/444; 74/492; 74/493; 280/779
(58) Field of Classification Search .............. 180/444; 74/492, 493; 280/779; 403/354
See application file for complete search history.

(56) References Cited

U.S. PATENT DOCUMENTS

| | | | |
|---|---|---|---|
| 5,582,489 A * | 12/1996 | Marzio et al. .............. 403/354 |
| 5,785,448 A * | 7/1998 | Courgeon et al. ........... 403/325 |
| 5,878,832 A * | 3/1999 | Olgren et al. ............... 180/444 |
| 6,183,012 B1 * | 2/2001 | Dufour et al. .............. 280/777 |
| 6,189,405 B1 * | 2/2001 | Yazane ........................ 74/493 |
| 6,237,438 B1 * | 5/2001 | Ben Rhouma et al. ....... 74/492 |
| 6,389,924 B1 * | 5/2002 | Ryne et al. ................... 74/493 |
| 6,419,043 B1 * | 7/2002 | Duval et al. ................ 180/444 |
| 6,550,568 B1 * | 4/2003 | Ross ........................... 180/444 |
| 6,782,771 B1 * | 8/2004 | Oka et al. ............... 74/388 PS |
| 2004/0000781 A1 * | 1/2004 | Lange et al. ................ 280/777 |

* cited by examiner

*Primary Examiner*—Tony Winner
(74) *Attorney, Agent, or Firm*—Lawrence E. Laubscher, Sr.; Lawrence E. Laubscher, Jr.

(57) ABSTRACT

A vehicle steering mechanism includes an electrical power assist device connected with the steering shaft by an adjustable coupling, thereby to permit accurate perfect alignment between the output shaft of the power assist device and the steering shaft on the steering axis of the mechanism. One or more transverse connecting members may be provided between the flange portions of the swivel plate and the front face of the housing of the power assist device.

14 Claims, 6 Drawing Sheets

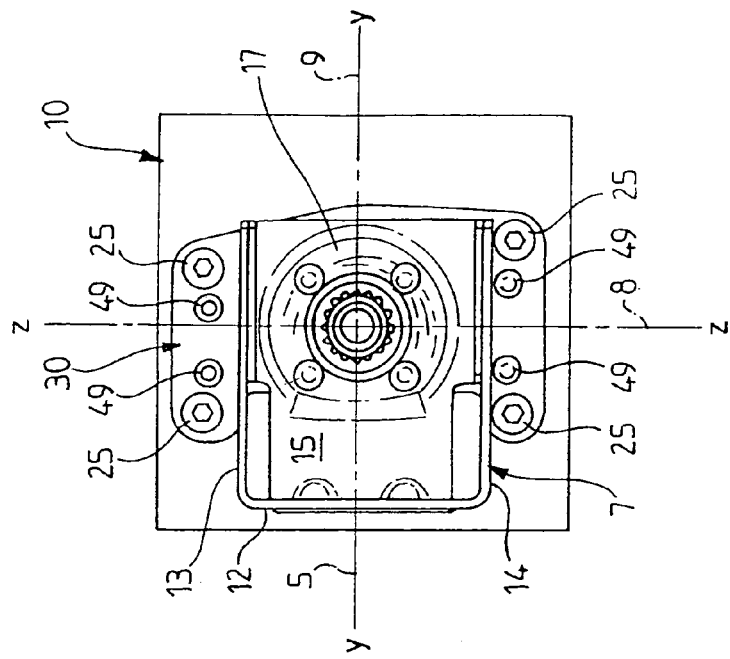
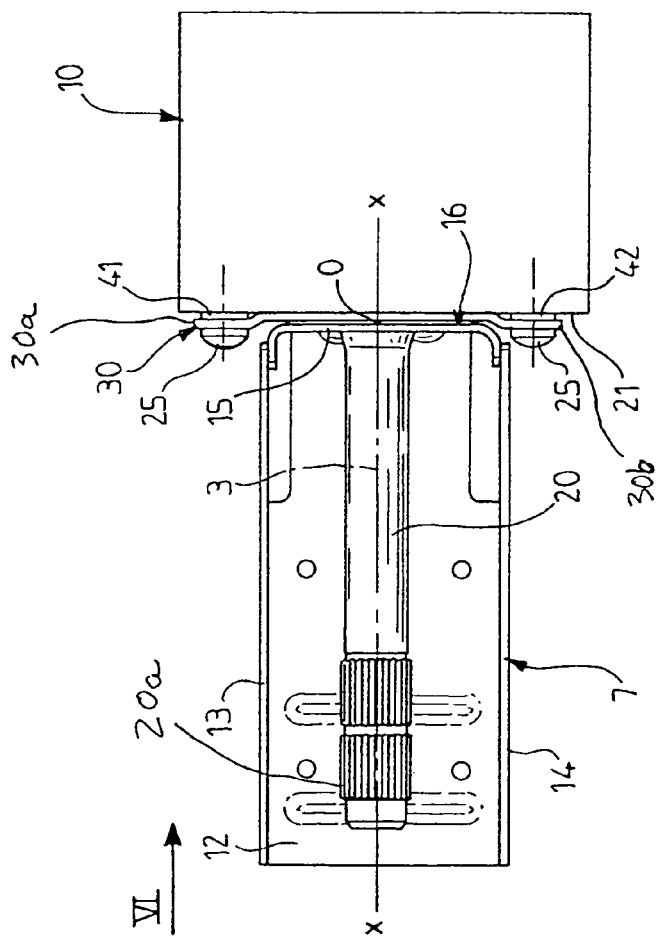
FIG. 6
FIG. 5

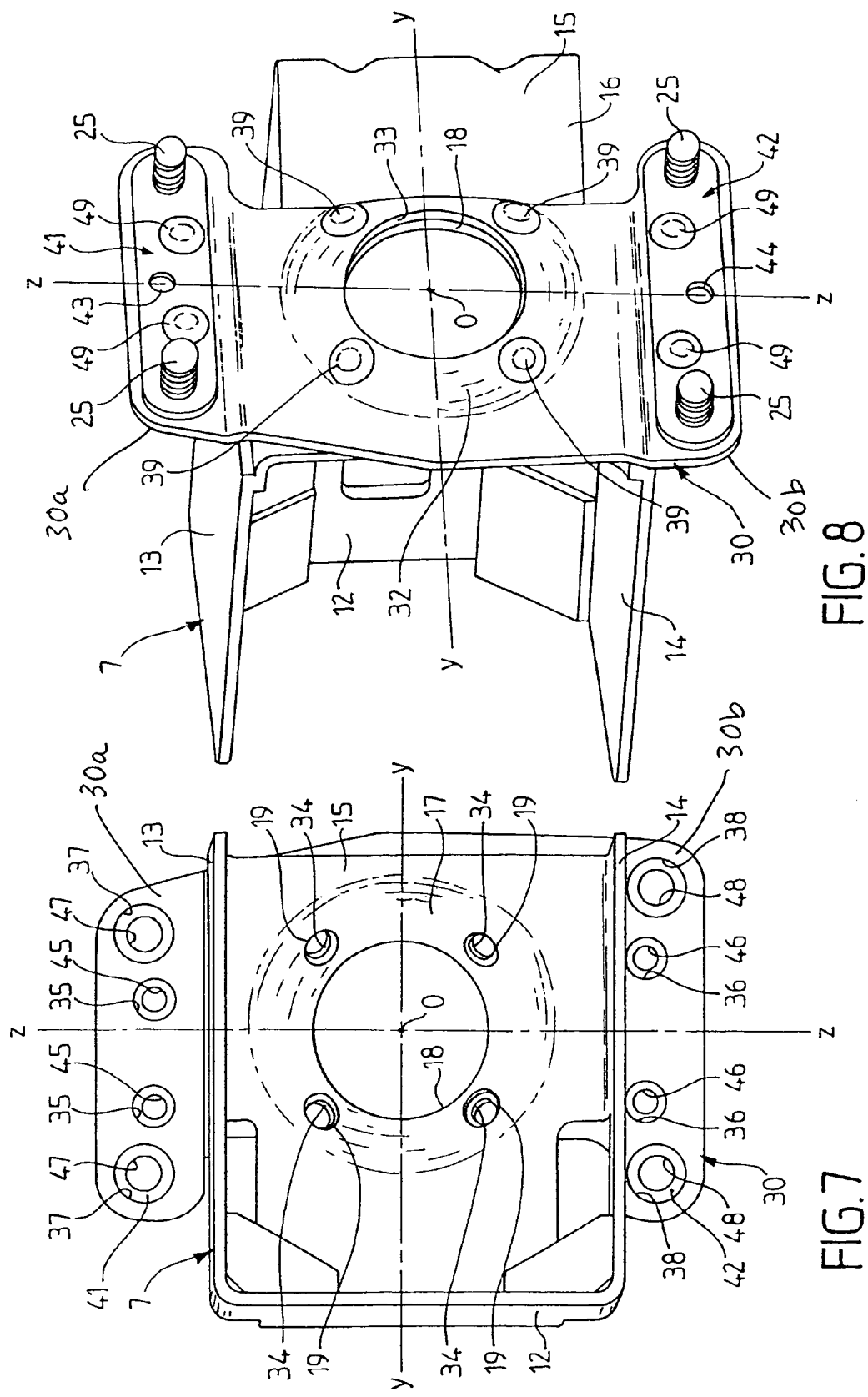

ELECTRICALLY-ASSISTED STEERING MECHANISM FOR VEHICLES

BACKGROUND OF THE INVENTION

1. Field of the Invention

This invention relates to coupling means for connecting electrical power assist means to the steering mechanism of a vehicle.

2. Description of the Related Art

Steering mechanisms for vehicles are well known in the prior art, as evidenced by the patents of Applicant to Ben Rhouma, et al., U.S. Pat. No. 6,237,438; Duval, et al., U.S. Pat. Nos. 6,419,043 and 6,578,872; and Dufour, et al. U.S. Pat. No. 6,183,012; among others. Various devices for coupling together shaft components of a vehicle steering column are also known in the art, as disclosed in the patents to Marzio, et al., U.S. Pat. No. 5,582,489 and Courgen, et al., U.S. Pat. No. 5,785,448, among others.

It has been proposed to provide such steering mechanisms with electric motor power assist means, thereby to reduce the manual effort required to steer a vehicle.

The present invention relates to an improved device for connecting an electrically-assisted power assist assembly with an automotive vehicle steering column assembly. The steering column comprises a top column portion and an intermediate column portion. The top portion of the column is connected to the steering wheel. The intermediate portion of the column is connected, on the one hand, to the top portion of the column and, on the other hand, to the motion input of the steering box. To ensure that the steering column will function correctly with electrically-assisted steering means, the axis of the electrical power assist assembly must be perfectly aligned with the steering axis of the top portion of the column.

BRIEF SUMMARY OF THE INVENTION

The primary object of this invention is to propose a device for coupling an electrical power assist steering assembly with a steering column assembly, which permits a perfect alignment of the two assemblies along the steering axis. At the same time, it permits easy installation in the existing structures using an assemblage that has a minimum axial size. The steering column assembly comprises a tube body in which is mounted a steering shaft that turns in accordance with a given steering axis, with the body of the column being mounted on a support arrangement that is integral with the structure of the vehicle.

According to another object of the invention, the column body includes a transverse wall with a transverse assemblage face extending generally normal to the steering axis. The electrically assisted steering assembly comprises a support face that is essentially normal to the steering axis. The entire assemblage is adjusted along three perpendicular axes Ox, Oy, Oz with the Ox axis being the steering axis that cuts the transverse assemblage face of the steering column at point O, the Oz axis being in the vertical plane of the steering axis and the Oy being in a plane perpendicular to the vertical plane. A swivel plate is so arranged that it will permit double rotation adjustment with respect to the Oy and Oz axes of the assemblage between the steering column assembly, said swivel plate, and said assemblage with the electrically assisted steering assembly. Connection means are arranged between the swivel plate and the support face of the electrical assisted steering so as to permit double translation adjustment with respect to the Oy and Oz axes of said assemblage. The swivel plate is arranged between the electrical power assist means and the column body.

Connecting means are arranged between the transverse wall of the steering column and the swivel plate. The connecting means comprise adjustment means arranged between the swivel plate and the support face of the power assist means, so that the axis of the power assist means and the axis of the steering column will be perfectly aligned with respect to each other according to the steering axis.

According to a more specific object of the invention, the swivel plate includes on one side a portion having the shape of a concave spherical crown of the Ox axis that surrounds a passage hole for the steering shaft. One side of the transverse wall comprises a portion in the shape of a spherical crown of the Ox axis, which surrounds a passage hole for the steering shaft. Each of the spherical portions is so arranged as to form spherical cooperation with respect to each other. Each spherical portion contains at least two passage holes for mounting the element between the transverse wall and the swivel plate. Each of the passage holes of one of the two spherical portions has a diameter that is larger than the diameter of the corresponding passage holes of the other spherical portion, which are adjusted with the diameter of the corresponding assemblage element. This difference in diameter makes it possible to place and correctly fix the swivel plate upon the column body by double rotation adjustment with respect to the Oy and Oz axes. Advantageously, according to a further object of the invention, the spherical portion of the plate is concave and receives the convex spherical portion of the transverse wall of the steering column.

According to an important structural feature of the invention, each spherical portion of the swivel plate and of the transverse wall has four holes for the passage of the assemblage element arranged in an equidistant circular pattern. The passage holes of the spherical portion of the transverse wall has a diameter that is larger than the diameter of the corresponding passage holes of the spherical portion of the swivel plate, which are adjusted with a diameter of the corresponding connecting element.

According to a first embodiment of the invention, the connecting means between the swivel plate and the electrical assisted steering support face includes at least one transverse member with the corresponding assemblage means so as to provide double adjustment in terms of translation with respect to the Oy and Oz axes of said assemblage device. The transverse member is arranged between the swivel plate and the electrical power-assisted steering mechanism.

In this embodiment of the invention, the transverse member contains two series of passage holes arranged on either side of the plane of the Ox and Oy axes. Each series of passage holes includes a centering hole arranged and adjusted according to the Oy, Oz axes with a corresponding centering pin arranged on the support face of the electrical assisted steering assembly, at least one passage hole for the element used in assembling the transverse member with the swivel plate being equipped with a corresponding passage hole, and at least one passage hole that corresponds with the swivel plate with at least one passage hole for the element used in assembling the swivel plate with said support face of the electrically-assisted power steering assembly equipped with a corresponding fixing hole. The different passage holes of the swivel plate or of the transverse member have a diameter that is larger than the diameter of the corresponding passage holes of the transverse member or of the swivel plate, which are adjusted to the diameter of the corresponding assemblage element. This difference in diameter is provided to make it possible to insert and correctly fix the transverse member on the swivel plate by double translation adjustment with respect to the Oy and Oz axes.

In this same structure of the invention, each series of passage holes for the transverse member comprises two passage holes of the two elements for the assemblage of the transverse member with the swivel plate equipped with two corresponding passage holes, and two passage holes corresponding to the swivel plate having two passage holes for the two elements used in the assemblage of the swivel plate with the support face of the power-assisted steering assembly equipped with two corresponding fixing holes. The passage holes of the swivel plate have a diameter that is larger than the diameter of the corresponding passage holes of the transverse member, which are adjusted to the diameter of the corresponding assemblage element consisting of a rivet and which are adjusted to the diameter of the corresponding fixing element consisting of a screw.

Regardless, according to the invention, the transverse member is made of one element or two elements, which are arranged on either side of the plane of the Ox, Oy axes, each element comprising a series of passage holes.

According to a second embodiment of the invention, the coupling means between the swivel plate and the support face of the electrical assisted steering include connecting means which are arranged between said swivel plate and said assisted steering support face to allow for double translation adjustment with respect to the Oy and Oz axes of said assemblage device. For this embodiment of the invention, the swivel plate has at least one passage hole, the three passage holes being arranged on either side of the Ox and Oy axes. Each of the passage holes that receives an element for the assembly of the swivel plate with said electrical assisted steering assembly support face is equipped with a corresponding fixing hole. The various passage holes of the swivel plate have a diameter that is greater than the diameter of the corresponding assemblage element. This difference in diameter is provided to make it possible to put in and correctly fix the swivel plate on the electrical assisted steering assembly to provide for double translation adjustment with respect to the Oy and Oz axes.

In this same structure of the invention, the swivel plate includes two passage holes on one side of the plane and two passage holes on the other side of the plane of the Ox and Oy axes. Each of the passage holes receives an element for the assemblage of the swivel plate with the support face of the assisted steering assembly equipped with four corresponding fixing holes. The passage holes of the swivel plate have a diameter that is larger than the diameter of the corresponding fixing element consisting of a screw.

The device for coupling of an electrical power assist assembly with a steering column assembly according to the invention thus offers the advantage of guaranteeing perfect alignment of the two assemblies with respect to each other along the steering axis. The device involved in the invention also offers the advantage of requiring a smaller number of parts that entail a small axial size and a low cost.

Moreover, the coupling device of the invention can be easily adapted to existing steering columns while allowing perfect alignment between the electrically-assisted power steering assembly and the column body assembly, which prevents any deleterious stress on the steering column.

BRIEF DESCRIPTION OF THE DRAWINGS

Other objects and advantages of the invention will become apparent from a study of the following specification when viewed in the light of the accompanying drawings, in which:

FIGS. 5 and 6 are side elevation and left hand views of the coupling apparatus of FIG. 4;

FIGS. 7 and 8 are views taken in the direction of the arrows VII and VIII, respectively, in FIG. 4.

DETAILED DESCRIPTION OF THE INVENTION

Figure 1:
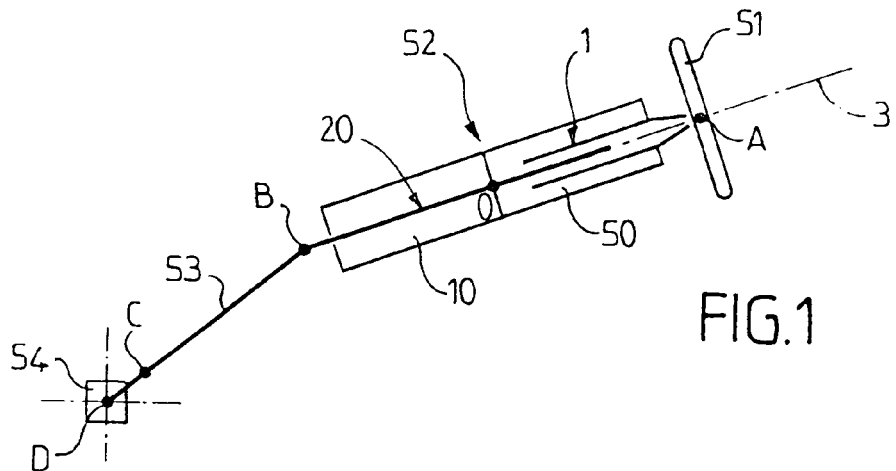
FIG. 1 is a schematic diagram of the vehicle steering system of the present invention.

Referring first more particularly to FIG. 1, the steering mechanism for the automotive vehicle includes a steering shaft 1 having a steering axis 3 that is connected at one end with a steering wheel 51. The steering mechanism includes an upper column portion extending between the points A and B, and an intermediate steering column portion 53 between the points B and C. The lower portion of the steering column between the points C and D is connected with the steering box 54. As shown in FIG. 1, the output shaft 20 of electrical power assist means 10 is connected with the steering shaft 1 at a connecting point 0. The electrical power assist means 10 serves to reduce the manual effort required to steer the vehicle via the steering box 54.

As is known in the art, the steering column may be adjusted longitudinally and/or angularly relative to the vehicle body in accordance with the size of the vehicle operator.

Figure 2:
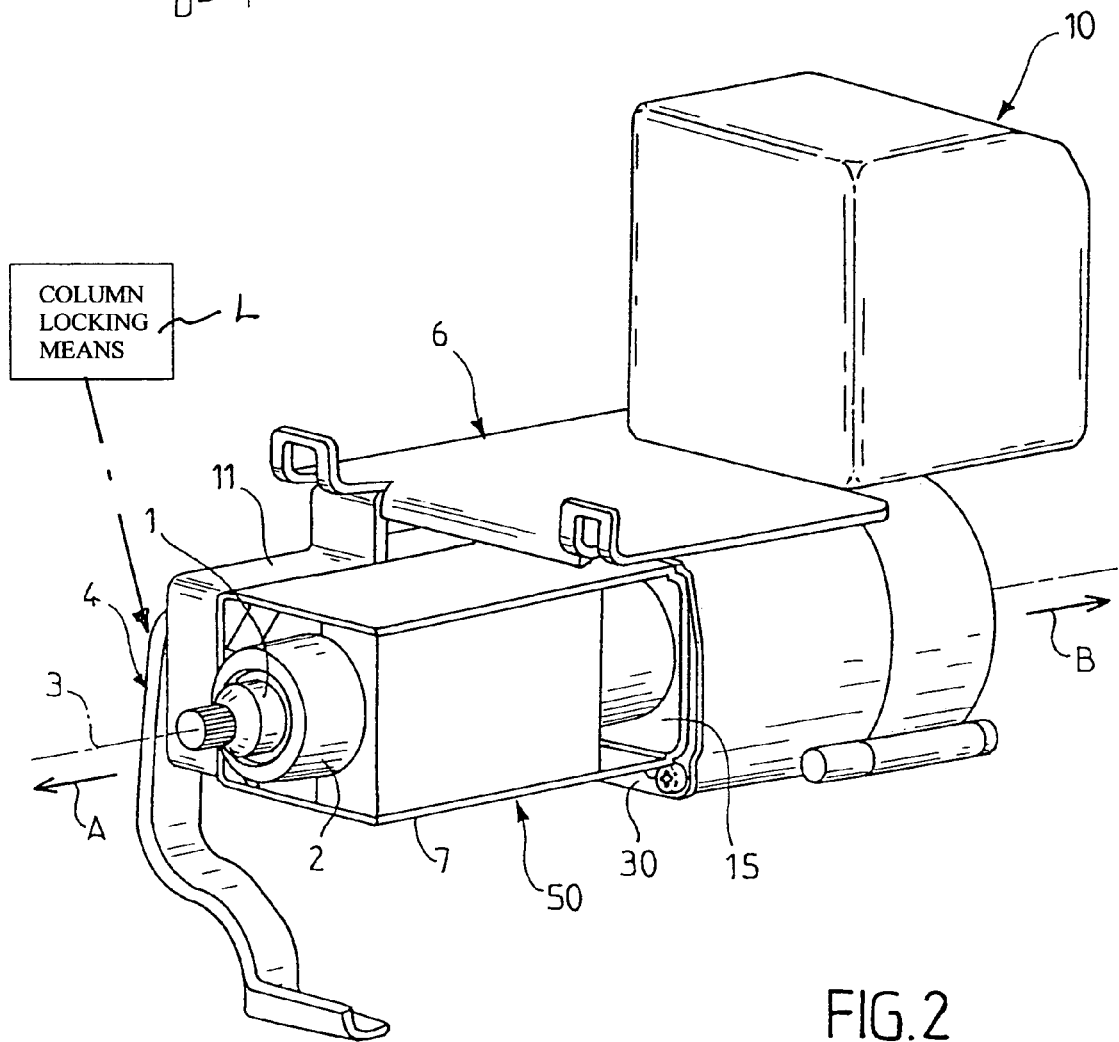
FIG. 2 is a front perspective view of the coupling apparatus.
Figure 3:
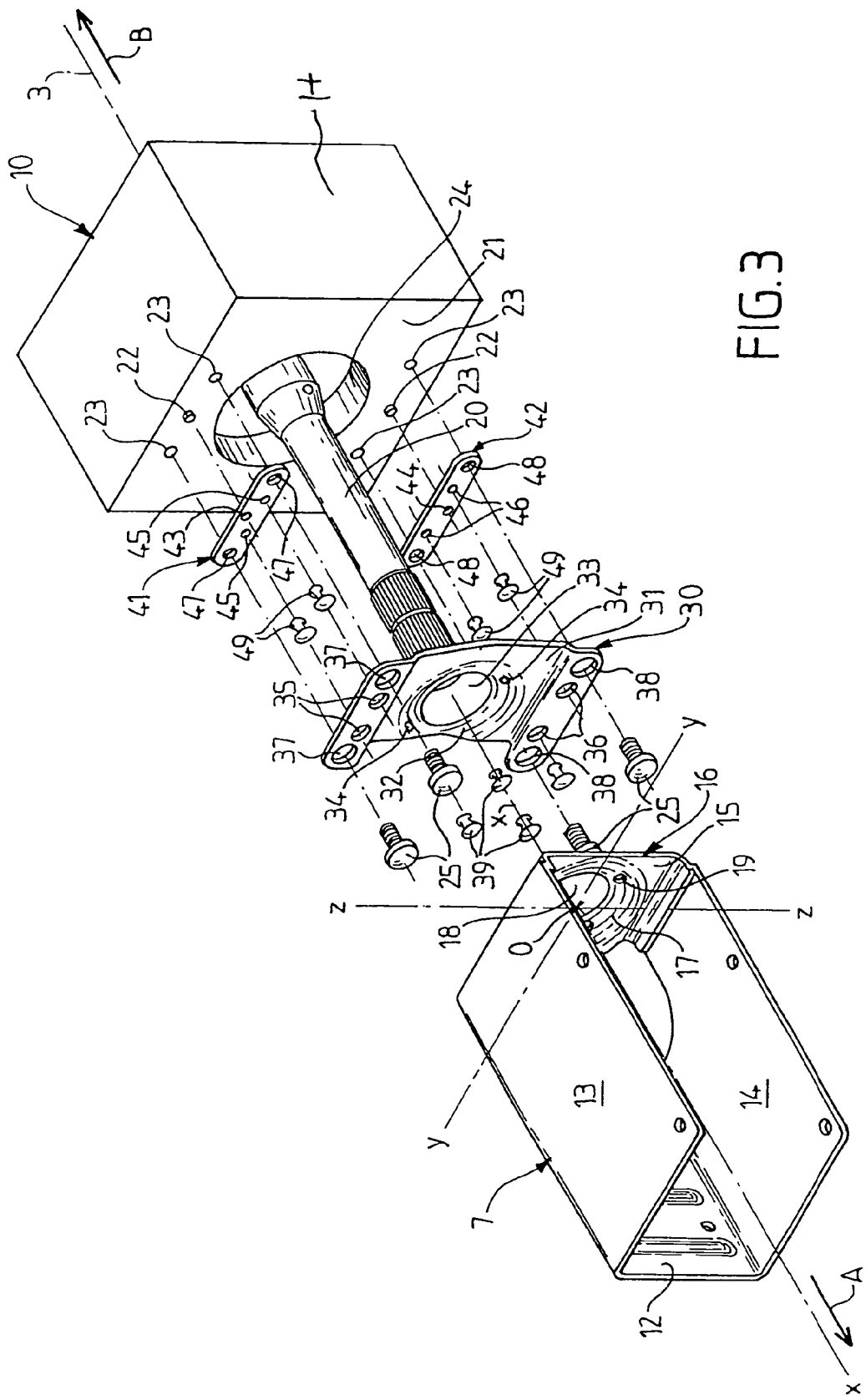
FIG. 3 is a exploded view of the coupling apparatus of FIG. 2.
Figure 4:
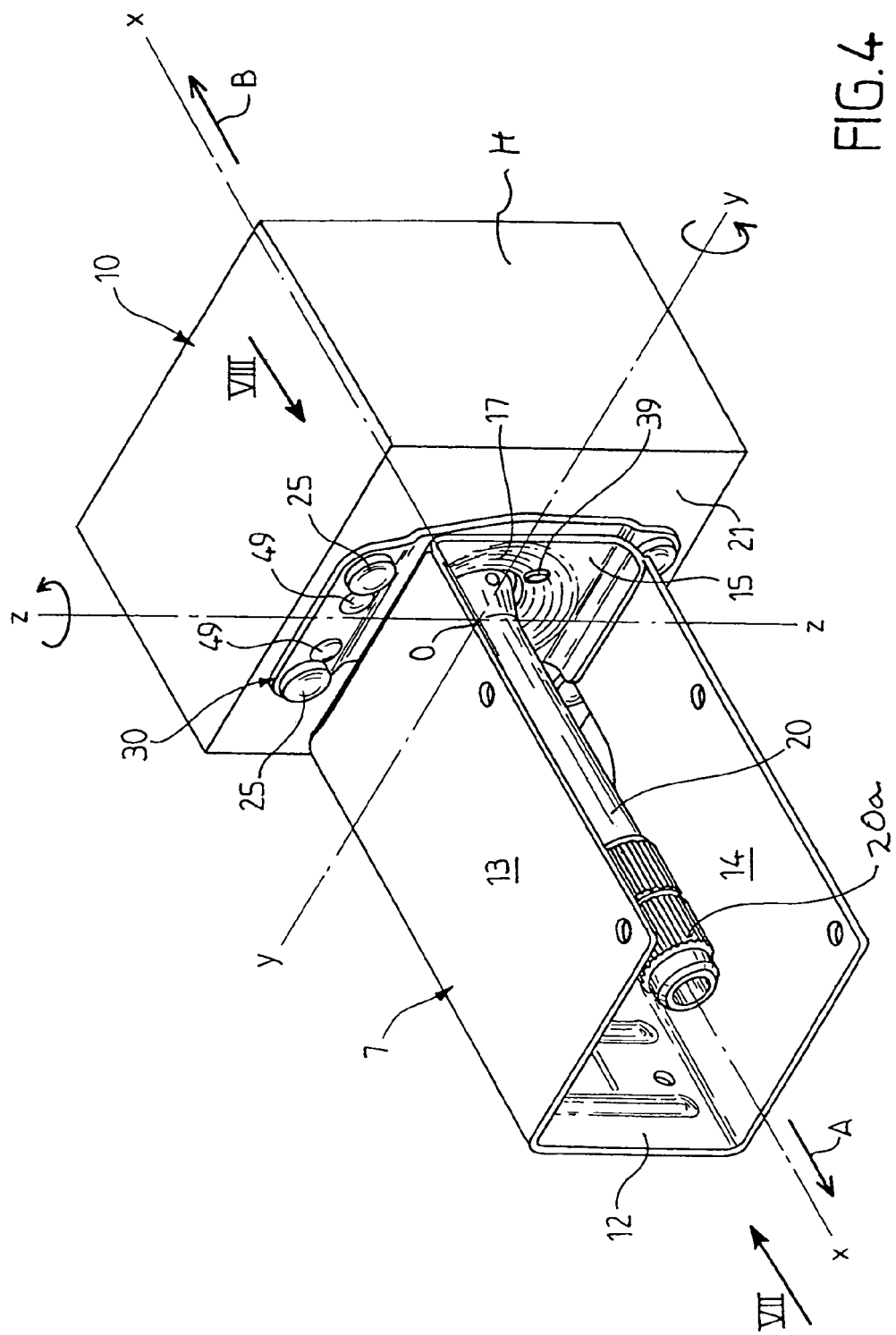
FIG. 4 is a front perspective view of the coupling apparatus with certain parts removed for clarity.

Referring now to FIG. 2, the electrical power assist means 10 is connected with the steering shaft 1 via the coupling assembly 50. This coupling column assembly includes a support bracket 7 that is connected with the support assembly 6 which in turn is connected with the vehicle chassis. The support bracket 7 has a generally U-shaped cross-sectional configuration and includes, as shown in FIGS. 3 and 4, a pair of parallel longitudinal walls 13 and 14 that extend on opposite sides of the steering axis 3, and a transverse bridging longitudinal wall 12 that extends between the side walls 13 and 14. The support bracket 7 also includes an end wall 15 that extends transversely in a plane normal to the steering axis 3. The steering shaft 1 is rotatably supported by the tubular sleeve member 2 that is mounted in fixed relation between the side walls 13 and 14 of the support bracket, thereby maintaining the axis of the steering shaft 1 in a position collinear with the steering axis 3. As is known in the art, the steering column can be adjusted for inclination and/or depth. Conventional locking means L including the lever 4 serve to lock the support bracket 7 of the fixed lateral extension 11 of the fixed support 6, as is known in the art.

Referring now to FIG. 3, it will be seen that the support bracket end wall 15 contains an opening 18 that is concentric with the axis of the steering shaft 1. As illustrated schematically in FIG. 1, the end of the steering shaft 1 remote from the steering wheel 51 is tubular and is internally splined for connection with the output shaft 20 of the electric power assist means 10, as will be described in greater detail below.

The power assist means 10 includes a housing H having a front wall 21 that is generally parallel with and spaced from the end wall 15 of the support bracket 7. The housing front wall 21 contains a through opening 24 through which extends the output shaft 20 of the electrical power assist means 10. As best shown in FIGS. 4 and 5, the free end of the power output shaft 20 is provided with splines 20a for connection with the internal splines contained in the tubular portion of the steering shaft 1. Arranged between the bracket 7 and the housing of the electrical power assist means 10 a swivel plate 30 having a central opening 33 that receives the end of the power output shaft 20 that extends within the steering shaft 1. In accordance with a characterizing feature of the invention, the end wall 15 includes concentrically around the opening 18 a generally semi-spherical portion 17 that defines on its other side a convex surface adjacent the swivel plate 30. Similarly, the swivel plate 30 contains in concentric relation to the opening 33 therein a concave recess portion 32 that cooperates with the convex surface of the swivel plate 30. The swivel plate 30 is adjustably connected with the end wall 15 of the support bracket 7 by fastener means 39 that extend through aligned holes 19 contained in the convex portion 17 of the bracket 7 and corresponding opening 34 contained in the swivel plate. The fasteners 39 are preferably rivets. In accordance with a characterizing feature of the invention, as shown in FIG. 7, the diameters of the openings 19 that are arranged in a equidistant pattern about the opening 18 have a larger diameter than the corresponding aligned openings 34 that are contained in the swivel plate of FIG. 3. Thus, the rivets 39 have a diameter that correspond with that of the smaller openings 34, and which is less than the larger openings 19, thereby to permit a certain degree of adjustability of the swivel plate 30 relative to the support bracket 7.

Coupling assembly 50 also includes a pair of transverse support members 41 and 42 that are arranged on opposite sides of the steering axis 3. These transverse support members are adapted to fit in corresponding flange portions 30a and 30b of the swivel plate 30, as best shown in FIG. 5. The transverse support members are connected with the swivel plate 30 by means of rivets 49 that extend through aligned openings 35 and 36 in the flange portions of the swivel plate in corresponding openings 45 and 46 contained within the transverse support members. Furthermore, the transverse support members contain centering openings 43 and 44 that receive corresponding centering pins 22 provided on the front wall 21 of the housing of the electrical power assist means 10. As best shown in FIG. 7, the diameters of the openings 45 and 46 of the transverse support members 41 and 42, respectively, are less than the corresponding diameters of the openings 35 and 36 contained in the flange portions 30a and 30b of the swivel plate 30, respectively. Finally, the swivel plate 30 is also connected with the housing of the electrical power assist means 10 by means of screw fasteners 25 that extend through openings 37 and 38 contained in the flange portions 30a and 30b of the swivel plate 30, respectively, through corresponding openings 47 and 48 contained in the transverse support members 41 and 42, and then into threaded engagement with the threaded bores 23 contained in the housing front wall 21. As shown in FIGS. 5 and 6, the connecting point 0 on the longitudinal horizontal axis X-X is defined within the opening 33 of the swivel plate, and the horizontal and vertical axes Y-Y, and Z-Z extend through this connecting point as shown in FIG. 6. Thus, in order to achieve the desired accurate alignment of the output shaft 20 with the steering axis 3, the adjusting screws 25 are arranged on opposite sides of the vertical plane 8 containing the vertical axis Z-Z, and above and below the plant containing the steering axis 2 and the horizontal axis Y-Y.

Referring to FIG. 7, it will be noted that the openings 35, 37, and 19 are oversized relative to the corresponding openings 45, 47, and 34. Thus, by appropriate adjustment of the adjusting screws 25, the inclination of the front wall 21 of the electrical power assist means 10 may be adjusted relative to the end wall 15 of the support bracket 7, thereby to cause the axis of the output shaft 20 to be collinear with the steering axis 3 and with the steering shaft 1 that is in splined connection therewith.

Figure 9:
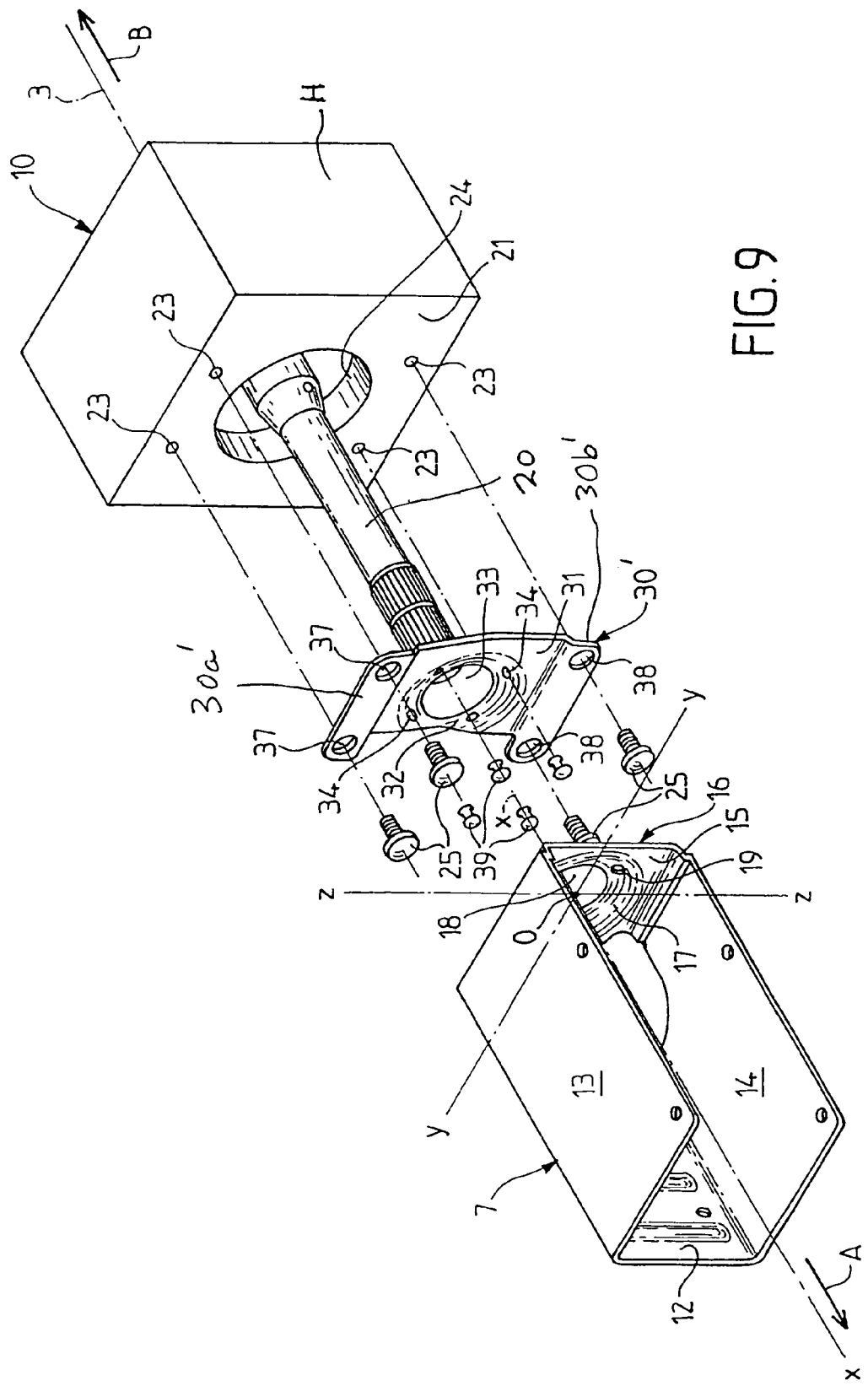
FIG. 9 is an exploded view of a second embodiment of the invention.

Accordingly to the preferred embodiment of the invention illustrated in FIG. 9, the transverse support members 41 and 42 of FIG. 3 are omitted, and the fastening screws 25 extend through the openings 37 and 38 contained in the flange portions of the swivel plate 30' directly into threaded engagement with the corresponding threaded bores 23 contained in the front wall 21 of the electrical power assist means 10. As before, the openings 19 contained in the end wall 15 of the support bracket 7 are oversized relative to the corresponding openings 34 contained in the spherical portion of the swivel plate 30', and the opening 37 has a greater diameter than that of the threaded bores 23 that are received by the screws 25. Thus, in this embodiment, adjustment of the screws 25 effects the angle of inclination of the front wall 21 of housing 10, thereby to permit the axis of the output shaft 20 to be in complete alignment with the steering axis 3 and the steering shaft 1 within which the spline end of the output shaft 20 extends.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. A steering mechanism for a vehicle including a chassis, comprising:
    (a) a steering shaft having first and second ends, said steering shaft defining a steering axis;
    (b) shaft support means supporting said shaft for rotation relative to the vehicle chassis, said shaft support means including:
        (1) a tubular sleeve mounted concentrically about said steering shaft first end;
        (2) means including a support bracket said sleeve relative to the vehicle chassis, said support bracket including an end wall extending normal to said steering axis, said end wall containing an opening concentric with said steering axis, said wall opening being adjacent said steering shaft second end;
    (c) electrical power assist means including:
        (1) a housing having a front wall that is generally normal to said steering axis, said front wall being adjacent, generally parallel with and spaced from said bracket end wall, said housing front wall containing an opening (24) generally concentric with said steering axis; and
        (2) an output shaft extending at one end outwardly through said housing opening toward generally collinear with and spaced from said steering shaft, said output shaft one end being adapted for non-rotatable connection with said steering shaft second end; and (d) connecting means adjustably connecting said power assist means with said shaft support means to effect connection between said power assist output shaft one end and said steering shaft second end, said connecting means including:
  (1) a swivel plate arranged between said support bracket end wall and said power assist housing front wall, said swivel plate containing an opening (33) generally concentric with said steering axis, said swivel plate and said bracket end wall containing cooperating concave and convex semispherical portions extending concentrically about the openings contained therein, respectively;
  (2) first fastener means connecting said swivel plate with said housing front wall; and
  (3) second fastener means connecting said swivel plate with said bracket end wall;
  (4) said first and second fastener means being operable to permit swiveling angular displacement of said housing relative to said support bracket to a position on which the axis of said output shaft is exactly collinear said steering axis.

2. A steering mechanism as defined in claim 1, wherein said adjustable connecting means is operable to vary the angle of inclination of said housing front wall relative to said support bracket end wall about a pair of orthogonally arranged axes (Oy, Oz) that are normal to the axis (Ox) of the steering axis.

3. A steering mechanism as defined in claim 2, wherein said connecting means further includes at least one transverse connecting member arranged between said housing front wall and said swivel plate; and third fastener means connecting said transverse connecting member with said swivel plate; said first fastener means being operable to connect said transverse connecting member with said housing front wall.

4. A steering mechanism as defined in claim 3, and further including centering means for centering said transverse connecting member relative to the opening contained in said housing front wall.

5. A steering mechanism as defined in claim 3, wherein said transverse connecting member, said swivel plate and said housing front wall contain aligned openings that receive said first fasteners, at least one of said aligned openings having larger diameter than the other openings, thereby to permit angular adjustment of said swivel plate relative to said housing front wall.

6. A steering mechanism as defined in claim 5, wherein said first fastener means comprises a screw, the diameter of the opening contained in said front wall corresponding with that of said screw.

7. A steering mechanism as defined in claim 3, wherein a pair of said transverse connecting members are arranged on opposite sides of said steering shaft.

8. A steering mechanism as defined in claim 2, wherein said concave portion is carried by said swivel plate, and said convex portion is carried by said support bracket end wall.

9. A steering mechanism as defined in claim 8, wherein said second fastener means extends between pairs of aligned second openings contained in said bracket end wall and said swivel plate, respectively, one of said second openings having a diameter that is greater than the diameter of the other second opening, thereby to permit angular adjustment of said swivel plate relative to said bracket end wall in said orthogonally arranged axes (Oy, Oz).

10. A steering mechanism as defined in claim 8, wherein said first fastener means extends through a pair of aligned first openings contained in said swivel plate and in said housing front wall, the first openings in said swivel plate having a greater diameter than the first openings in said housing front wall, thereby to permit angular adjustment of said swivel plate relative to said housing front wall.

11. A steering mechanism as defined in claim 10, wherein said first fastener means comprises a screw, the diameter of the first opening contained in said housing front wall corresponding with that of said screw.

12. A steering mechanism as defined in claim 8, wherein said concave and convex portions contain four aligned pairs of second openings, one opening of each said pair having a larger diameter than the other opening of said pair, said second fastener being a rivet the cross-sectional diameter of which corresponds with that of the smaller of said pair of openings.

13. A steering mechanism as defined in claim 2, wherein said first fastener means comprises four adjustment screws each extending through an oversized opening contained in said swivel plate and terminating in threaded engagement with a corresponding threaded bore contained in said housing front wall, two pairs of said adjustment screws being arranged on opposite sides of a vertical plane containing one of said orthogonally arranged axis, two pairs of said adjustment screws being arranged in a plane containing the other of said orthogonally arranged axis and said steering axis.

14. A steering mechanism as defined in claim 1, wherein the end of said steering shaft adjacent said power assist shaft is tubular and is internally splined, the adjacent end of said power assist shaft being externally splined and extending within, and in splined engagement with, said internally splined tubular end of said steering shaft.

* * * * *